United States Patent [19]

Tagawa et al.

[11] Patent Number: 4,731,565
[45] Date of Patent: Mar. 15, 1988

[54] HIGH VOLTAGE GENERATOR FOR TELEVISION APPARATUS

[75] Inventors: Susumu Tagawa, Kanagawa; Chihiro Miura, Chiba, both of Japan

[73] Assignee: Sony Corporation, Tokyo, Japan

[21] Appl. No.: 776,917

[22] Filed: Sep. 17, 1985

[30] Foreign Application Priority Data

Sep. 25, 1984 [JP] Japan .................. 59-199883

[51] Int. Cl.[4] .......................... H01J 29/70
[52] U.S. Cl. .................... 315/411; 358/243
[58] Field of Search ........... 315/411, 383; 358/190, 358/243

[56] References Cited

U.S. PATENT DOCUMENTS

| | | | |
|---|---|---|---|
| 3,970,895 | 7/1976 | Willis | 315/383 |
| 4,126,816 | 11/1978 | Willis | 358/243 |
| 4,218,720 | 8/1980 | Kam et al. | 358/243 |
| 4,292,654 | 9/1981 | Steckler et al. | 358/190 |
| 4,414,578 | 11/1983 | Takeichi | 358/243 |

Primary Examiner—Theodore M. Blum
Attorney, Agent, or Firm—Lewis H. Eslinger; Alvin Sinderbrand

[57] ABSTRACT

A high-voltage stabilizer circuit cooperates with the flyback transformer in a cathode ray tube display system to prevent level variations in the video signal from producing corresponding variations in the high-voltage output from the flyback transformer to the cathode ray tube, such high-voltage variations being undesirable because they result in changes in the electron beam position on the phosphor screen that produce shifts in the resultant picture. The current flowing through the video circuit is controlled inversely in relation to variations in the cathode current of the cathode ray tube so that the high-voltage output from the flyback transformer remains constant. This high-voltage stabilizer involves specific choices of circuit element values and is particularly suitable for so-called flat-tube television receivers.

7 Claims, 4 Drawing Figures

HIGH VOLTAGE GENERATOR FOR TELEVISION APPARATUS

BACKGROUND OF THE INVENTION

1. Field of the Invention

This invention relates generally to a high-voltage stabilizing circuit suitable for use in stabilizing a high-voltage that is supplied to a cathode ray tube from a flyback transformer and, particularly, a high-voltage stabilizer for use with a flat-type cathode ray tube.

2. Description of the Prior Art

It is known to utilize the horizontal output transformer as the "flyback" transformer to develop the high-voltage necessary for a cathode ray tube. This output transformer typically provides both the high-voltage for the cathode ray tube and also the horizontal scanning voltage. In such output or flyback transformer high-voltage circuits, it is known that the high-voltage output fluctuates depending upon the total load in the transformer secondary, which is a function of the resistance of the transformer winding, the impedances of the rectifier diode and bypass capacitor, and other circuit elements forming the switching circuit. Additionally, the high-voltage output will also be influenced by the cathode current of the cathode ray tube, which varies in response to the input video signal, because the video output circuit that receives the video signal is powered by a low voltge also produced by the flyback transformer. The resultant effect of these high-voltage fluctuations is that the position and size of the picture formed on the cathode ray tube will vary. While such picture variations are known, they have not been critical, because the variations in position and size of the picture are not necessarily noticeable in a conventional cathode ray tube. This is because the axial alignment of the guns relative to the phosphorus screen do not cause a large shift in the picture for normal variations in the high-voltage output. However, such position and size variations of the picture are quite conspicuous in a so-called flat-type cathode ray tube, such as is employed in currently available miniature, personal television receivers. This conspicuous variation in size and position of the picture in such flat-type cathode ray tubes is due to the relatively small angle between the phosphorus screen and the center axis of the electron gun or guns of the tube, relative to a conventional cathode ray tube.

OBJECTS AND SUMMARY OF THE INVENTION

Accordingly, it is an object of the present invention to provide a high-voltage generator, including a flyback transformer, for a television receiver having a flat-type cathode ray tube that can avoid the above-noted defects inherent in the prior art.

It is a further object of the present invention to control the current flowing through a video output circuit inversely relative to the cathode current of a cathode ray tube, so that input power to the flyback transformer is held constant and the high-voltage output thereof also remains constant in the face of such variations in cathode current.

Another object of this invention is to provide an improved high-voltage generation and stabilizing circuit for a flat-type cathode ray tube, in which the impedance values of a shunt regulation circuit are chosen to provide voltage stabilization of the fly-back transformer circuit.

In accordance with an aspect of the present invention, there is provided a high-voltage stabilization circuit for use in a flat-type cathode ray tube in which the values of the circuit components are chosen such that, when the high-voltage for the cathode ray tube is produced by the secondary of the fly-back transformer and a low voltage fed to the video circuit of the cathode ray tube is also produced at a secondary of the fly-back transformer, and the current flowing in the video circuit is inversely controlled in relation to variations of the cathode current of the cathode ray tube, the high-voltage remains constant irrespective of variations in the cathode current of the cathode ray tube caused by variations of the input video signal level.

This is accomplished by providing that the total input power to the flyback transformer remains constant regardless of the cathode current. Stated another way, the power consumption of the video output transistor is inversely controlled based upon the cathode current of the video picture tube.

The above and other objects, features, and advantages of the present invention will become apparent from the following detailed description of illustrative embodiments thereof, to be read in conjunction with the accompanying drawings, in which like reference numerals refer to like elements.

DETAILED DESCRIPTION OF PREFERRED EMBODIMENTS

Figure 1:
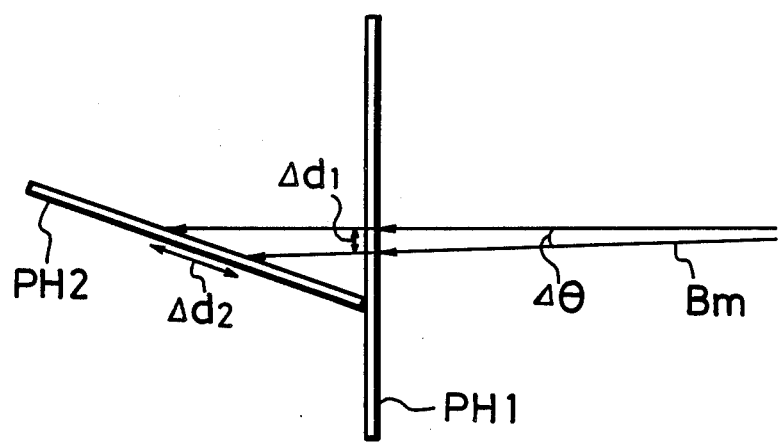
FIG. 1 is a schematic representation of an electron beam utilized to energize the phosphorus screen of a cathode ray tube of the so-called flat-type.

FIG. 1 is a representation clearly showing the increased adverse effects caused when high-voltage fluctuations cause electron beam variations in a so-called flat-type cathode ray tube, in relation to a conventional straight-line cathode ray tube. More specifically, PH1 represents the phosphorus screen of the conventional cathode ray tube, and PH2 represents the phosphorus screen of the so-called flat-type cathode ray tube. If the electron beam $B_m$ from the cathode ray tube gun (not shown) is displaced by an angular extent $\Delta\theta$, with such displacement being typically caused by variations in the high-voltage output transformer circuit, the displacement or positional error caused by this electron beam displacement on the conventional cathode ray tube screen PH1 is represented at $\Delta d_1$, whereas on the flat-type tube screen the image displacement caused by $\Delta\theta$ is represented as $\Delta d_2$. As can be clearly seen in FIG. 1, the extent of displacement $\Delta d_2$ on the flat-type cathode ray tube screen PH2 is substantially greater than the displacement $\Delta d_1$ on the conventional cathode ray tube screen PH1. This displacement becomes so conspicuous in a flat-type cathode ray tube because the phosphorus screen PH2 is disposed outside the central axis of the electron gun of the tube in order to avoid the formation of an ion spot.

Figure 2:
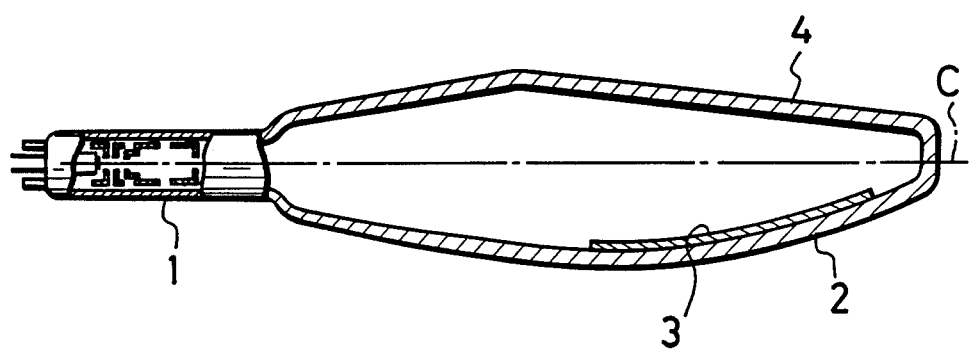
FIG. 2 is a cross-sectional view of a flat-type cathode ray tube showing the relationship between the phosphorus screen and the electron gun thereof.

The actual construction of a typical flat-type tube is represented in FIG. 2, in which the phosphorus screen 3 is formed on a screen panel 2 at a position displaced from the central axis C of the electron gun 1 of the cathode ray tube in the so-called off-set position. The picture tube provides a flat front panel 4, whereby the image formed on the phosphorus screen 3 can be seen by the viewer through the flat front panel 4.

Accordingly, the necessity for the present invention to provide a high-voltage stabilizing circuit that can operate to hold the high-voltage output constant irrespective of level changes of the video signal is seen from FIGS. 1 and 2.

Figure 3:
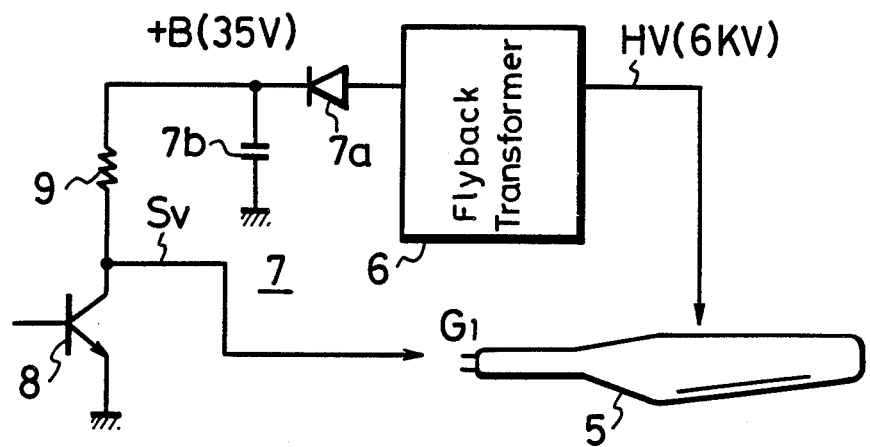
FIG. 3 is a schematic diagram showing an embodiment of the present invention.

According to one aspect of the present invention as represented in the embodiment of FIG. 3, a high-voltage that is supplied to the flat-type cathode ray tube 5 is produced at a secondary of flyback transformer 6, and a low voltage supplied to the video output circuit is produced from another secondary of flyback transformer 6 and fed through rectifier 7 to video output circuit 8 and the current in video output circuit 8 is inversely controlled relative to the cathode current in tube 5. Thus, both the high-voltage and the DC low voltage for the video output circuit 8 are supplied by a mutual output transformer and the present invention strives to maintain the input power constant to transformer 6. In other words, when the cathode current of the cathode ray tube 5 increases thereby tending to lower the high-voltage, the current flowing through the video circuit, that is, through transistor 8, is regulated to become smaller, thereby suppressing high-voltage fluctuations and keeping the high-voltage output to tube 5 from decreasing. On the other hand, when the cathode current of tube 5 becomes smaller, thereby tending to raise the high-voltage, the present invention operates so that the current flowing through the video output circuit 8 will increase to suppress high-voltage variations.

In FIG. 3, flyback transformer 6 will typically produce at a secondary a high voltage HV that is in the neighborhood of 6 kilovolts for this flat-type, black and white, cathode ray tube 5. The high-voltage, of course, would be much greater in the case of a color television tube. Additionally, a pulsed voltage is also produced by a secondary of flyback transformer 6 and is supplied to, and rectified by, rectifier circuit 7 comprised of a series diode 7a and a capacitor 7b connected between the output of diode 7a and relative ground potential. Rectifier 7 then produces a rectified DC voltage (B+) of approximately 35 volts. The video output amplifier is comprised of an NPN transistor 8 that amplifies the video input signal applied to the base thereof in the conventional fashion. In this general representation, the emitter of transistor 8 is connected to relative ground potential and the video output signal $S_v$ obtained at the collector is the positive polarity video signal applied to first grid $G_1$ of cathode ray tube 5, whereby cathode ray tube 5 is operated in the so-called $G_1$ drive mode. In a commerical embodiment of the video output circuit a resistor may be employed in the emitter circuit of transistor 8. The video output transistor 8 is connected to the B+ voltage produced by flyback transformer 6 through a resistor 9, the value of which is specifically chosen, as taught by the present invention, to operate as current regulator.

Figure 4:
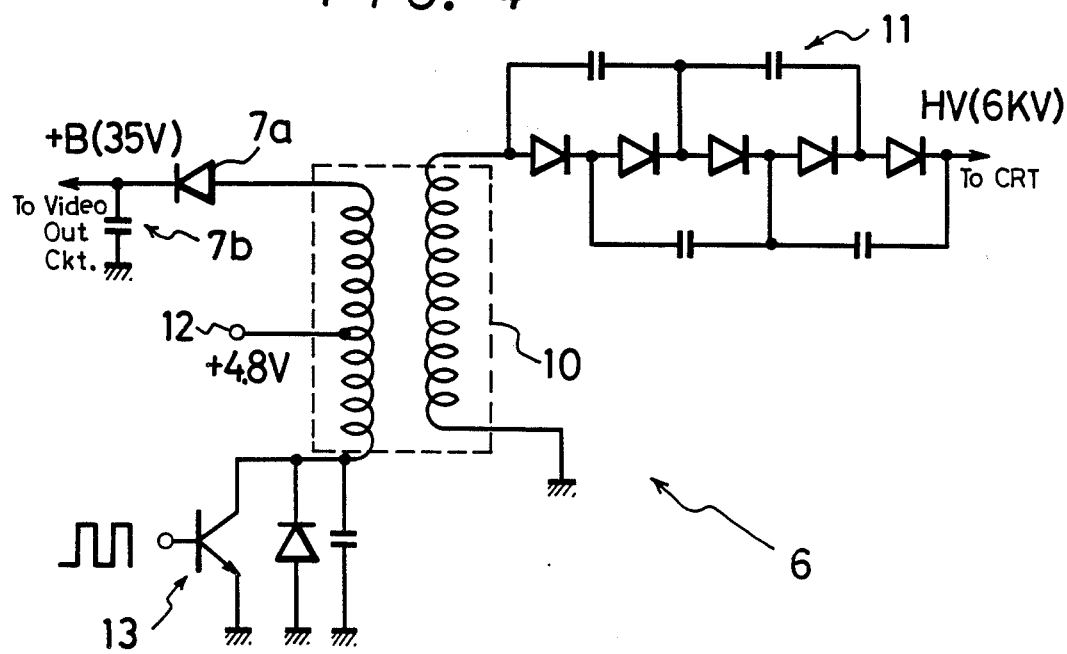
FIG. 4 is a circuit diagram of the fly-back transformer used in the embodiment of FIG. 3.

To better understand this operation reference is had to FIG. 4, which shows the flyback transformer circuit 6 in more detail. In this circuit the high voltage for the cathode ray tube 5 is produced by a conventional flyback transformer 10 as a pulsed signal and is rectified to a DC signal by a rectifier circuit, shown generally at 11. In this embodiment the rectifier 11 is a simple half-wave rectifier formed using diodes in series with smoothing or filter capacitors connected in parallel therewith. Because the ripple in this high-voltage is at the horizontal oscillator rate of 15,750 Hz, large value filter capacitors are not required. Flyback transformer 10 is energized by a voltage from a DC power supply at a center tap 12 of a primary winding that has connected at a lower end the collector of the horizontal deflection output transistor circuit 13. This horizontal output deflection transistor circuit 13 is conventional.

In the operation of the embodiment of FIG. 3, the high-voltage stabilizing circuit acts so that when the level of the video signal $S_v$ applied to the first grid $G_1$ of the cathode ray tube 5 is relatively high causing a high cathode current, which would tend to drive the high voltage $H_v$ supplied from flyback transformer 6 to cathode ray tube 5 lower, the current flowing through rectifier circuit 7 to transistor 8 through resistor 9 is held small. Thus, it is seen that if increases in power of the video amplifier equal decreases in power of the high voltage circuit, then the overall input power will remain constant. If such input power remains constant the pulse height of the horizontal output transistor will not vary and the voltage of the high-voltage circuit is stabilized. In this way, the pulse height of the horizontal output that results in the high voltage at the secondary of flyback transformer 6 is maintained, thereby suppressing any decrease in the high voltage $H_v$. Conversely, when the video signal $S_v$ fed to first grid $G_1$ of cathode ray tube 5 is of a relatively low level, the cathode current of the cathode ray tube 5 is correspondingly lower the high-voltage supplied from the fly-back transformer 6 to the cathode ray tube 5 would be raised except that the current flowing from the rectifier circuit 7 to transistor 8 through resistor 9 is increased and the power consumed in the transistor 8 is increased, thereby maintaining the pulse height of the pulse voltage at the secondary of the fly-back transformer 6 and suppressing any increases in high voltage $H_v$ in that case.

Note that the maximum power of the video output amplifier is consumed under the condition when transistor 8 is saturated and the minimum power consumption is zero that occurs when transistor 8 is opened. The maximum power typically consumed in a flat-type cathode ray tube apparatus is 1.2 watts.

In order to obtain such control of high-voltage variations, the ohmic value of resistor 9 is selected to be substantially lower than the value typically employed in such a collector bias resistor of a video output amplifier 8. The typical value for this collector bias resistor is known to be around 15 kohms. Because the value of this resistor 9 is chosen to balance the circuit as shown in FIG. 3, its value is arrived at empirically based on the impedances of the other elements in the circuit. In a production model of the SONY Watchman FD-20A, the resistance value of resistor 9 following this invention would be selected to be in a range of 1.2 Kohms to 1.8 Kohms.

Accordingly, based upon the present invention and as evidenced by the embodiment discussed above, regardless of changes in the level of the video signal $S_v$ that is fed to the first grid $G_1$ of cathode ray tube 5, the high-voltage HV that is supplied to cathode ray tube 5 can be kept constant. In this fashion, it is then possible by following the teaching of the present invention to prevent the position and size of the picture from varying by maintaining constant the high-voltage produced by the flyback transformer.

Although the above-described embodiment is intended for use with the flat-type cathode ray tube, 5, the present invention may also be applied to conventional cathode ray tube configurations with the same advantageous effects. In such case, the benefits are not quite so conspicuous as shown in FIG. 1 above.

The above description is provided for a single preferred embodiment of the invention, however, it will be apparent that many modifications and variations could be effected by one skilled in the art without departing from the spirit or scope of the novel concepts of the invention, which should be determined only by the appended claims.

What is claimed is:

1. In a video display device, the combination of a cathode ray tube having a cathode, a video output circuit, a flyback transformer producing at respective secondaries a high voltage fed to said cathode ray tube and a low voltage fed to said video output circuit that also receives a video signal and provides a first current varying in response to variations in said video signal for driving said cathode of the cathode ray tube, and circuit balancing means connected between said flyback transformer and said video output circuit for changing the total current flowing in said video output circuit by supplying a second current to said video output circuit to be added to said first current, said total current changing in an inverse relationship relative to changes in the cathode current of the cathode ray tube caused by the video signal such that the high voltage is maintained constant and is fed to said cathode ray tube in spite of variations in the cathode current of said cathode ray tube.

2. A video display device according to claim 1, in which said video output circuit includes a transistor, and said means for changing the extent of current flowing in the video output circuit comprises a resistance element connected in series between said flyback transformer and said transistor of the video output circuit and having a resistance value in the range of 1.2 Kohms to 1.8 Kohms.

3. A video display device according to claim 2, in which the resistance value of said resistance element is sufficient to maintain the input power to said flyback transformer constant between maximum and minimum power consumption values of said video output circuit.

4. In a video display device, the combination of a flat-type cathode ray tube having a cathode, a video output circuit, a flyback transformer producing at one secondary a high voltage fed to said cathode ray tube and at another secondary a low voltage fed to said video output circuit that also receives a video signal and provides a first current varying in response to variations in said video signal for driving said cathode of said cathode ray tube, and circuit balancing resistance element means connected to receive said low voltage form the flyback transformer and being connected to said video output circuit for controlling current flow through the latter by supplying a second current to said video output circuit to be added to said first current, said current flowing through video output circuit changing in inverse proportion to changes in the cathode current of the cathode ray tube resulting from the video signal such that the high voltage produced by the flyback transformer is maintained constant and is fed to said cathode ray tube during said changes in cathode current of the cathode ray tube.

5. A video display device according to claim 4, in which said resistance element means has a resistance value in the range of between 1.2 Kohms to 1.8 Kohms.

6. A video display device according to claim 5, in which said resistance value of said resistance element means is sufficient to maintain the input power to the flyback transformer constant between maximum and minimum power consumption values of the video output circuit.

7. A video display device according to claim 5, in which said video output circuit includes a transistor having a base receiving said video signal, a collector and an emitter, and a rectifier is connected at said another secondary, and wherein said resistance element means is connected in series between said collector of said transistor and an output of said rectifier, and said emitter of said transistor is connected to relative ground potential.

* * * * *